(12) United States Patent
Sasaki et al.

(10) Patent No.: US 8,762,619 B2
(45) Date of Patent: Jun. 24, 2014

(54) DISPLAY WITH MULTIPLE VIDEO INPUTS AND PERIPHERAL ATTACHMENTS

(75) Inventors: Lawrence H. Sasaki, Oxford Station (CA); David Glen, Toronto (CA)

(73) Assignee: ATI Technologies ULC, Markham, Ontario (CA)

(*) Notice: Subject to any disclaimer, the term of this patent is extended or adjusted under 35 U.S.C. 154(b) by 310 days.

(21) Appl. No.: 13/010,164

(22) Filed: Jan. 20, 2011

(65) Prior Publication Data
US 2012/0191894 A1  Jul. 26, 2012

(51) Int. Cl.
*G06F 13/00* (2006.01)

(52) U.S. Cl.
USPC .............. 710/316; 710/36; 710/37; 710/62

(58) Field of Classification Search
CPC .. G06F 3/14; G09G 2370/24; H01R 13/2442; H01R 13/6658; H01R 31/02
USPC ............ 710/36, 37, 38, 62, 72, 73, 250, 316
See application file for complete search history.

(56) References Cited

U.S. PATENT DOCUMENTS

| | | | |
|---|---|---|---|
| 6,618,774 B1 * | 9/2003 | Dickens et al. | 710/64 |
| 6,957,287 B2 * | 10/2005 | Lou et al. | 710/72 |
| 7,028,110 B2 * | 4/2006 | Seki et al. | 710/36 |
| 7,047,331 B2 * | 5/2006 | Dickens | 710/63 |
| 7,102,691 B2 * | 9/2006 | Dischert et al. | 348/552 |
| 7,231,402 B2 * | 6/2007 | Dickens et al. | 1/1 |
| 7,350,091 B2 * | 3/2008 | Chen et al. | 713/375 |
| 7,428,606 B2 * | 9/2008 | Liu et al. | 710/62 |
| 7,496,697 B2 * | 2/2009 | Sween et al. | 710/38 |
| 7,502,878 B1 * | 3/2009 | Wright | 710/37 |
| 7,519,749 B1 * | 4/2009 | Sivertsen | 710/73 |
| 7,535,830 B2 * | 5/2009 | Cromer et al. | 370/227 |
| 7,587,534 B2 * | 9/2009 | Liu et al. | 710/62 |
| 7,613,927 B2 * | 11/2009 | Holovacs | 713/182 |
| 7,631,337 B2 * | 12/2009 | King et al. | 725/141 |
| 7,774,516 B2 * | 8/2010 | Hsieh et al. | 710/36 |
| 7,840,728 B1 * | 11/2010 | Sivertsen | 710/73 |
| 7,861,020 B1 * | 12/2010 | Sivertsen | 710/73 |
| 7,917,674 B2 * | 3/2011 | Lin et al. | 710/73 |
| 8,001,302 B2 * | 8/2011 | Sivertsen | 710/72 |
| 8,015,332 B2 * | 9/2011 | Kobayashi | 710/62 |
| 8,024,502 B2 * | 9/2011 | Zhang et al. | 710/72 |
| 8,031,169 B2 * | 10/2011 | Hoerl | 345/156 |
| 8,176,226 B2 * | 5/2012 | Hsueh et al. | 710/72 |
| 2003/0131127 A1 * | 7/2003 | King et al. | 709/238 |
| 2005/0273312 A1 * | 12/2005 | Sandulescu et al. | 703/25 |

(Continued)

OTHER PUBLICATIONS

Black Box Network Services. DKM FX and FXC HD Video and Peripheral Matrix Switching System. 2013.*

(Continued)

*Primary Examiner* — Matthew D Spittle
(74) *Attorney, Agent, or Firm* — Faegre Baker Daniels LLP

(57) ABSTRACT

A display device that has multiple inputs for receiving video data and peripheral data from multiple computing devices, and an output for attaching a peripheral. The display is operable in one of two states, to provide both a video and peripheral signal paths between a selected one of the interconnected computing devices and the display's panel and attached peripherals. At any given time only one of the computing devices may utilize both the display and any attached peripherals. Exemplary embodiments may handle video and peripheral data streams received from a computing device over a single physical link.

26 Claims, 6 Drawing Sheets

(56) References Cited

U.S. PATENT DOCUMENTS

| | | | |
|---|---|---|---|
| 2005/0275641 A1* | 12/2005 | Franz | 345/204 |
| 2006/0123182 A1* | 6/2006 | Sandulescu et al. | 710/316 |
| 2007/0038939 A1* | 2/2007 | Challen et al. | 715/734 |
| 2007/0285394 A1* | 12/2007 | Lee et al. | 345/168 |
| 2008/0050951 A1* | 2/2008 | Wu | 439/108 |
| 2008/0126629 A1* | 5/2008 | Huang | 710/64 |
| 2008/0266256 A1* | 10/2008 | Lee | 345/163 |
| 2009/0063712 A1* | 3/2009 | Sun et al. | 710/4 |
| 2010/0064066 A1* | 3/2010 | Ho | 710/15 |
| 2010/0180055 A1* | 7/2010 | Lyon et al. | 710/62 |
| 2011/0057881 A1* | 3/2011 | Wen et al. | 345/163 |
| 2011/0060849 A1* | 3/2011 | Lin | 710/15 |

OTHER PUBLICATIONS

Vetra Systems Corporation. User Instruction for the USB-882 Series "MegaMux" Keyboard, Mouse, and Video Multiplexer. 2011.*

* cited by examiner

DISPLAY WITH MULTIPLE VIDEO INPUTS AND PERIPHERAL ATTACHMENTS

FIELD OF THE INVENTION

The present invention relates generally to data transmission between displays, peripherals and computing devices, and more particularly to data communication between computing devices interconnected to a display with multiple video inputs and attached peripherals.

BACKGROUND OF THE INVENTION

Personal computers (PCs) have become ubiquitous and indispensable tools in a wide variety of fields ranging from simple personal communication to critical business applications. Moreover, the use of peripherals has considerably increased the power and ease of use of personal computers. In addition to internal peripheral expansion cards, many external peripherals that can be easily attached and detached to PCs are now commonly available.

The proliferation of external peripherals has been facilitated by the universal serial bus (USB) standard that defines a fast, bidirectional serial interface. USB allows dynamic attachment and detachment of a wide variety of peripherals to a USB host formed as part of a PC, without requiring a reboot.

At the same time, concurrent or sequential use of multiple computing devices has become common place. For example, a user may wish to use a laptop and a desktop computing device for clerical or office task. Likewise, a user may wish to switch between a gaming computer and an office computer. Typically, each computing device is interconnected to its own dedicated set of peripherals and display.

Some modern displays provide multiple video inputs, which allow them to be interconnected to two or more computing devices. This allows a single display to be shared among many computing devices, thereby obviating the need for multiple displays. To use a selected computing device interconnecting such a display, the video input interconnected with the currently selected computing device may be enabled while the rest of the video inputs are disabled. Nevertheless, each computing device still requires equipped with its own set of peripherals. Unfortunately, this requires the user to utilize separate sets of peripherals to interact with different computing devices.

Known methods for sharing displays and peripherals among many computers have many disadvantages. Maintaining multiple sets of peripherals is costly and also consumes space and energy. In addition, disconnecting and reconnecting video or peripheral interconnections is a cumbersome and inefficient way to use a display and peripherals with multiple host computing devices.

Accordingly, there remains a need for new methods and devices that allow efficient and convenient sharing of display and peripherals, among multiple computing devices.

SUMMARY OF THE INVENTION

In accordance with an aspect of the present invention, there is provided a display operable in one of at least a first and second states. The display comprises: a first video input, a second video input, a first peripheral input and a second peripheral input; a peripheral output for attaching at least one peripheral; a display subsystem; a video selector having an output interconnecting the display subsystem, the video selector coupling: the first video input to the display subsystem in the first state, and the second video input to the display subsystem in the second state; and a peripheral selector interconnecting the first and second peripheral inputs, and the peripheral output, the peripheral selector coupling: the first peripheral input to the peripheral output in the first state, and the second peripheral input to the peripheral output in the second state.

In accordance with another aspect of the present invention, there is provided a display operable in one of a first and second states comprising: a first and second inputs for receiving combined streams of video and peripheral data, carried on the same physical link; a separator comprising: an input for receiving a selected one of the combined streams; a first output to provide the video data from the selected stream; and a second output to provide the peripheral data from the selected stream; a display subsystem interconnected to the first output of the separator; a selector in communication with the first and second inputs having an output coupled to the input of the separator; the selector coupling: the first input to the separator in the first state, and the second input to the separator in the second state.

In accordance with yet another aspect of the present invention, there is provided a method of sharing a display and at least one peripheral among at least a first and second computing devices. The display comprises: a first and second video inputs, a first and second peripheral inputs, a hub, a display subsystem, a video selector interconnecting the first and second video inputs and the display subsystem, and a peripheral selector interconnecting the first and second peripheral inputs and the hub. The method comprises: attaching the at least one peripheral to the hub in the display; attaching a first and second video outputs from the first and second computing devices to the first and second video inputs of the display, respectively; attaching first and second peripheral interconnects from the first and second computing devices to the first and second peripheral inputs, respectively; selectively interconnecting one of the first and second peripheral interconnects to the at least one peripheral through the hub, as the display subsystem is provided with a video signal from the first and second computing devices, respectively, by way of the first and second video inputs.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
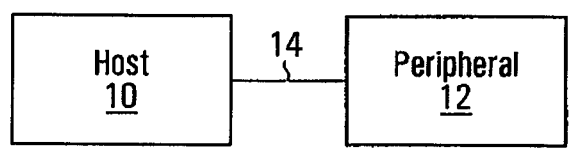
FIG. 1 is a simplified block diagram of a host device interconnected to a generic peripheral by a suitable link.

It is well known to attach peripherals such as keyboards, mice, portable music players, video camcorders, digital cameras, and the like, to a host computing device over a serial bus. FIG. 1 depicts a simplified block diagram of a host device 10, and a generic peripheral 12 interconnected by a suitable cable 14. Host device 10 may a personal computer or a laptop having a USB host controller therein. Peripheral 12 may be any USB device and cable 14 may be a USB cable. Of course, multiple peripherals may be interconnected to host device 10.

Figure 2:
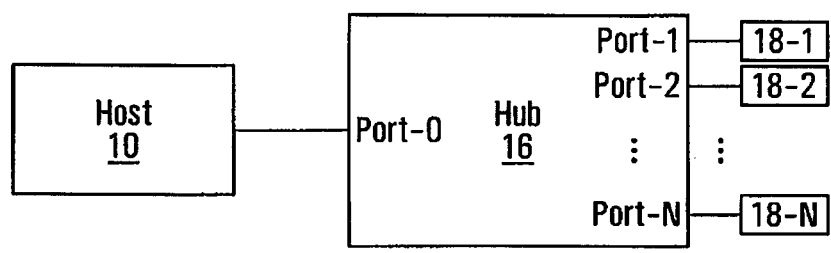
FIG. 2 is a logical diagram in a host device is interconnected to multiple peripherals by way of hub.

Accordingly FIG. 2 depicts a logical diagram in which host device 10 is interconnected to a USB hub 16, which allows multiple peripherals to interconnect to host device 10. As depicted, USB hub 16 has one upstream port (port-0) and N downstream ports (port-1, port-2 port-N). In a USB context, downstream refers to the direction of data away from the host, to a peripheral, while upstream refers to the opposite direction of data traffic from a peripheral to a host. Thus in FIG. 2, upstream port-0 interconnects the USB host device 10 by way of a suitable USB cable, while any one of the downstream ports in hub 16 may be optionally interconnected to a peripheral. Accordingly the upstream ports port-1, port-2 . . . port-N, are shown interconnected to corresponding peripherals 18-1, 18-2 . . . 18-N (individually and collectively peripherals 18) respectively.

A USB hub, such as hub 16, can be embedded into a peripheral. For example, a USB hub may be included as part of a keyboard, to allow other peripherals to be attached to a USB host in an interconnected computing device. Other peripherals such as a USB mouse can thus be attached to the keyboard. Upstream USB data traffic from each peripheral attached to the keyboard can be transmitted to the computing device and vice versa.

Now, it is often desirable to use multiple computing devices at the same locale. This may be required for example to control a clustered computing environment in which multiple computers—typically mounted on a rack—are interconnected to a common control station. Similarly, software developers often need to install and test software packages on multiple hardware configurations having different memories, different processors, varying power consumption characteristics, etc. Here again, it is disadvantageous to have disconnect and reconnect the keyboard, monitor and mouse, to the current test computer.

Likewise, a home user may wish to switch back and forth between an office computing device and a gaming device acting as a computer. Similarly, a user may wish to alternately use a media center PC and a regular computing device, or switch between a Linux device and a Windows machine.

In these and other similar scenarios, it may be desirable to allow all the computing devices to operate concurrently, and to enable a user or tester to selectively interact with a desired one of the computers, without reconnecting the display, mouse and keyboard or without having to use another set of peripherals.

Figure 3:
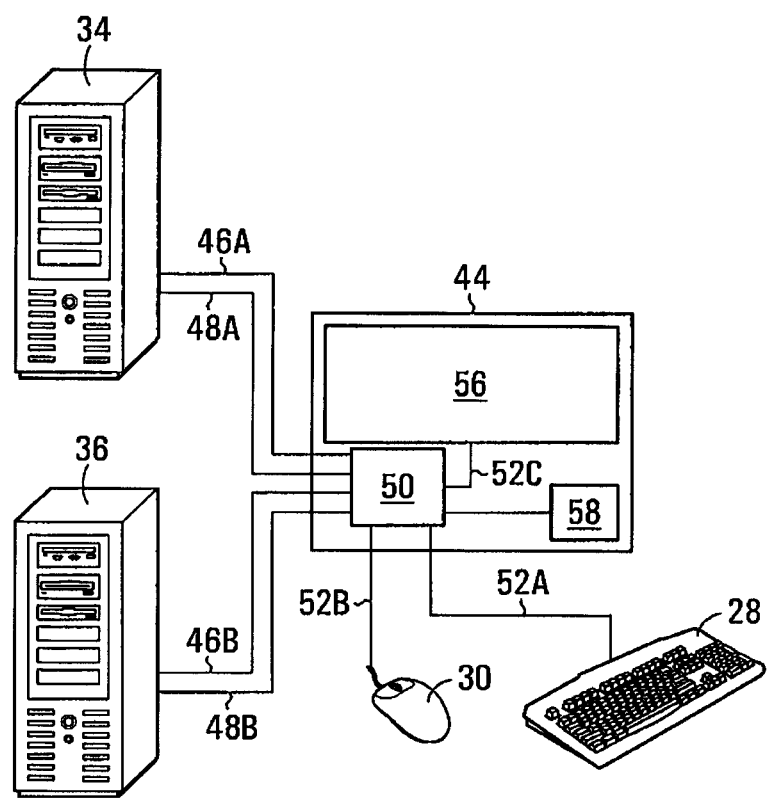
FIG. 3 is a simplified block diagram of two computing devices interconnected to a multi-input display device, exemplary of an embodiment of the present invention, that further interconnects a mouse and a keyboard.

Accordingly, FIG. 3 depicts a simple block diagram of a display 44, exemplary of an embodiment of the present invention. Display 44 interconnects to multiple computing devices e.g., computing device 34 and computing device 36. Computing device 34 is interconnected to display 44 by way of a video link 46a and a peripheral link 48a. Similarly device 36 interconnects display 44 using a video link 46b and a peripheral link 48b.

Display 44 includes an internal switching circuit 50, a display subsystem 56 and selection logic 58. Display 44 also includes two video inputs interconnected to video links 46a, 46b and two peripheral inputs interconnected to peripheral links 48a, 48b.

Display subsystem 56 may be a conventional display subsystem and may include a display panel or screen for displaying images. For example, display 44 may be a liquid crystal display (LCD) and thus display subsystem 56 may include an LCD panel. An LCD panel may include a two dimensional array of liquid crystals for representing pixels. Display subsystem 56 may include internal memory for receiving digital pixel values to be displayed. The memory may be coupled to digital to analog converters and/or amplifiers to provide analog outputs that ultimately drive the transistors interconnecting individual crystals. In addition to a display panel, display subsystem 56 may also optionally include various image and video processing blocks. For example display subsystem 56 may include a scaling block, a color space conversion block, a gamma correction unit, and the like. These blocks may be used to manipulate digital pixel values prior to outputting final image pixels on the display panel. LCD subsystems and other similar display subsystems such as plasma, organic light emitting diode (OLED) and the like would be known to those of ordinary skill in the art.

Peripherals such as a keyboard 28 and a mouse 30 may be in communication with (e.g. attached to) switching circuit 50 in display 44 using links 52a, 52b. Switching circuit 50 interconnects display subsystem 56 by way of a link 52c. Peripheral links 48a, 48b may be USB links while video links 46a, 46b may be HDMI links, DVI links, DisplayPort links or the like. In one exemplary embodiment, peripheral links 48a, 48b may both be USB links while video links 46a, 46b may be DVI links. In an alternative exemplary embodiment, peripheral links 48a, 48b may be USB links while video links 46a, 46b may be HDMI links. In another alternate embodiment video links 46a, 46b may both be DisplayPort compliant links. In yet another alternate embodiment video link 46a may be a DisplayPort link, and link 46b may be an HDMI, DVI, or other link. Other combinations of interconnects (e.g. VGA, component, etc.) will be apparent to those of ordinary skill. In yet alternate embodiment, some or all of the video links and peripheral links could be wireless links. Example wireless links include Wireless Gigabit; WiDi; WiFi; Wireless HD; Bluetooth or the like. As required, device 44 may include suitable wireless interfaces to interconnect devices 34, 36 to switching circuit 50.

Selection logic 58 in display 44, may be formed as a microcontroller, a simple switch, sensor activated circuit, a processor or the like. Alternately selection logic 58 may be equipped with a signal or voltage detector coupled to video (or peripheral) inputs on display 44. Optionally, selection logic 58 may be in communication with inputs receiving links 46a, 46b to determine which of the links is active, and select a state to provide the active video link and associated peripheral link to display interface 56. If both links are active, selection logic 58 may select a pre-determined state providing one of the two links 46a, 46b. Similarly, if both links are active and one of the links (e.g. link 46a) becomes inactive, selection logic 58 may switch to the other link (e.g. link 46a).

Figure 4:
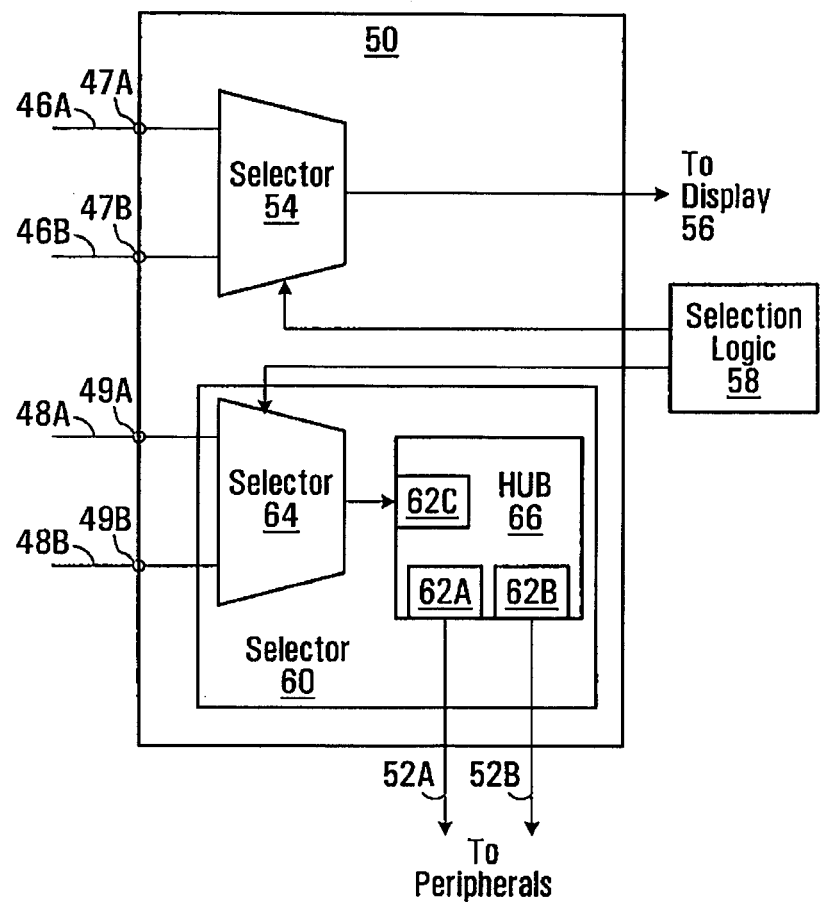
FIG. 4 is a detailed schematic diagram of the switching circuit depicted in FIG. 3.

FIG. 4 depicts a schematic diagram of an exemplary embodiment of switching circuit 50. As depicted, switching circuit 50 includes a video selector 54 and a peripheral selection block 60. Switching circuit 50 includes two video inputs 47a, 47b interconnected to video links 46a, 46b respectively, and two peripheral inputs 49a, 49b interconnected to peripheral links 48a, 48b respectively.

Selector 54 may have two inputs and an output interconnected to display subsystem 56, and may be operable to selectively couple one of its inputs to its output. For example, video selector 54 may be a two-input one-output multiplexing circuit formed as an application specific integrated circuit (ASIC). As depicted in FIG. 4, input 47a of switching circuit 50 interconnects one input of selector 54, while input 47b interconnects another input of selector 54. As a result, video inputs 47a, 47b are also inputs to selector 54.

Video selector 54 may for example be formed from commercially available HDMI or DVI switch ASICs such as TMDS251 from Texas Instruments Inc., AD8190 from Analog Devices Inc., FSHDMI04 from Fairchild Semiconductor Corp., or the like.

Peripheral selection block 60 may include a peripheral selector 64 and optionally a hub 66. Selection block 60 may further contain various other blocks such as phase-locked loop (PLL) circuits, voltage regulators and the like (not shown). As illustrated in FIG. 4, input 49a of switching circuit 50 interconnects one input of selector 64, and input 49b interconnects the other input of selector 64. As such, peripheral inputs 49a, 49b are also inputs to selector 64. In one embodiment, selection block 60 may be formed as a discrete ASIC component that may be similar to commercially available integrated circuits such as ISP1161 from NXP Semiconductors (formerly Philips Electronics).

Hub 66 may be a USB hub and may include one or more downstream ports such as downstream ports 62a, 62b and one upstream port 62c. USB hubs are well known to those of ordinary skill in the art.

Selector 64 may have two or more peripheral inputs and one peripheral output interconnected to upstream port 62c of interconnected hub 66. Selector 64 is thus operable to selectively couple one of its inputs to its output and thus to upstream port 62c of hub 66. Selector 64 may for example be a 2:1 USB multiplexing circuit with a separate input for a selection signal.

Selection logic 58 may be in communication with both selectors 54, 64 to provide selection inputs. Selection logic 58 may form part of switching circuit 50 or may be external to it.

Switching circuit 50 uses selector 54 and selection block 60 to provide electrical coupling of one of computing devices 34, 36 to each of display subsystem 56, keyboard 28 and mouse 30. Either device 34 or device 36 may thus be coupled to display subsystem 56, keyboard 28 and mouse 30 based on selector inputs from selection logic 58.

In operation, selection logic 58 may signal video selector 54 to couple one of the two video inputs (e.g. input 47a interconnecting computing device 34) to display subsystem 56. Concurrently, selection logic 58 signals selection block 60 to couple peripheral input 49a (interconnected to the same computing device 34) to upstream port 62c of hub 66.

Conversely selection logic 58 may instead signal video selector 54 to couple video input 47b (interconnecting computing device 36) to display subsystem 56 while at the same time signaling selection block 60 to couple input 49b (also interconnected to computing device 36) to upstream port 62c.

As noted, selection logic 58 may choose its state based on which of links 46a, 46b is active.

Accordingly, only one selected computing device provides both video and peripheral data to display 44 at a given time. Switching circuit 50 (and thus display 44) may thus be operated in one of two states.

Display 44 is thus operable in one of two states. In a first state, video selector 54 couples input 47a to display subsystem 56 while in a second state, video selector 54 couples video input 47b to display subsystem 56. Concurrently, in the first state peripheral selector 64 couples peripheral input 49a to hub 66 while in the second state selector 64 couples peripheral input 49b to hub 66.

In the first state, switching circuit 50 provides a video path from computing device 34 (i.e., input 47a) to display subsystem 56 while at the same time providing a peripheral data path (e.g. USB interconnection) from computing device 34 (i.e., from input 49a), to peripherals interconnecting display 44 (i.e., keyboard 28 and mouse 30). In the second state, (i.e., if computing device 36 is selected by selection logic 58) switching circuit 50, provides a video path from computing device 36 to display subsystem 56 while at the same time providing a peripheral data path from computing device 36 to both keyboard 28 and mouse 30. This allows a user using display 44 and attached peripherals (e.g. keyboard 28 and mouse 30) to selectively interact with a single computing device at a time.

In one embodiment, selection logic 58 may be operated manually by way of a button on display 44 to allow a user to select either computing device 34 or 36 to provide video and peripheral data.

Alternately, selector logic 58 may select either computing device 34 or 36 to be the active computer, based on the detected presence of a video (or peripheral) signal at a video (or peripheral) input of display 44. If video signals are detected at both inputs 47a, 47b (or inputs 49a, 49b) of switching circuit 50, then selection logic 58 may use pre-assigned priorities (for video inputs 47a, 47b), to determine which video input would be coupled to display system 56. For example, each video input may be assigned a different priority and whenever a video signal is detected on the highest priority input, selection logic 58 may set switching circuit 50 (i.e., selectors 54 and 64) to couple the highest priority video input (e.g. input 47a) to the display system 56; and couple its corresponding peripheral input (e.g. input 49a) to upstream port 62c of hub 66 respectively.

In other embodiments, the video input that presents either the earliest or the newest signal detected by selection logic 58 may be coupled to display subsystem 56. As may be appreciated, many ways of realizing and operating selection logic 58 are possible.

Conveniently, display 44, keyboard 28 and mouse 30 may be shared among multiple computing devices including computing devices 34, 36. In one exemplary method, keyboard 28 and mouse 30 may be attached to display 44; video outputs from computing devices 34, 36 may be attached to video inputs 47a, 47b respectively; and peripheral interconnects or links 48a, 48b may be attached from computing devices 34, 36 to peripheral inputs 49a, 49b respectively. The exemplary method involves selectively interconnecting one of links 48a, 48b to keyboard 28 and mouse 30 through hub 66, as display subsystem 56 is provided with a video signal from computing devices 34, 36, respectively, by way of video inputs 47a, 47b.

Figure 5:
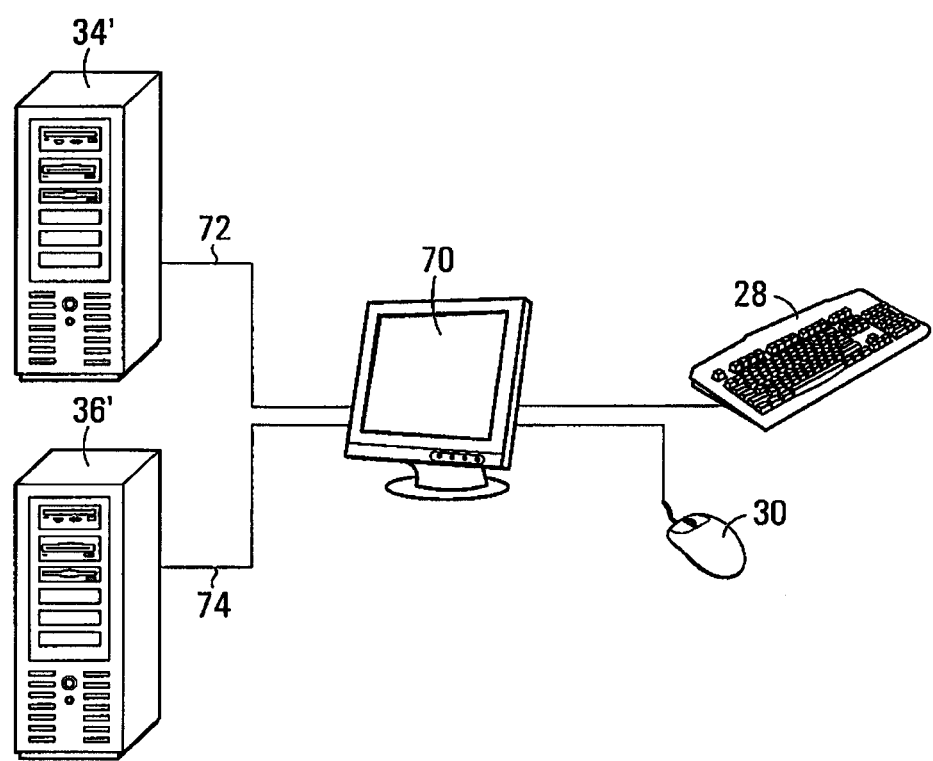
FIG. 5 is a block diagram of two computing devices interconnected to another exemplary display device further interconnecting peripherals.

FIG. 5 depicts a simplified block diagram of a display 70 exemplary of another embodiment of the present invention. Display 70 is interconnected to two computing devices 34', 36'. Link 72 interconnects display 70 to device 34' while link 74 interconnects display 70 to device 36'. Display 70 also interconnects peripherals (e.g. keyboard 28 and mouse 30), thereby providing the required electrical coupling between device 34' or device 36' and the attached peripherals.

Figure 6:
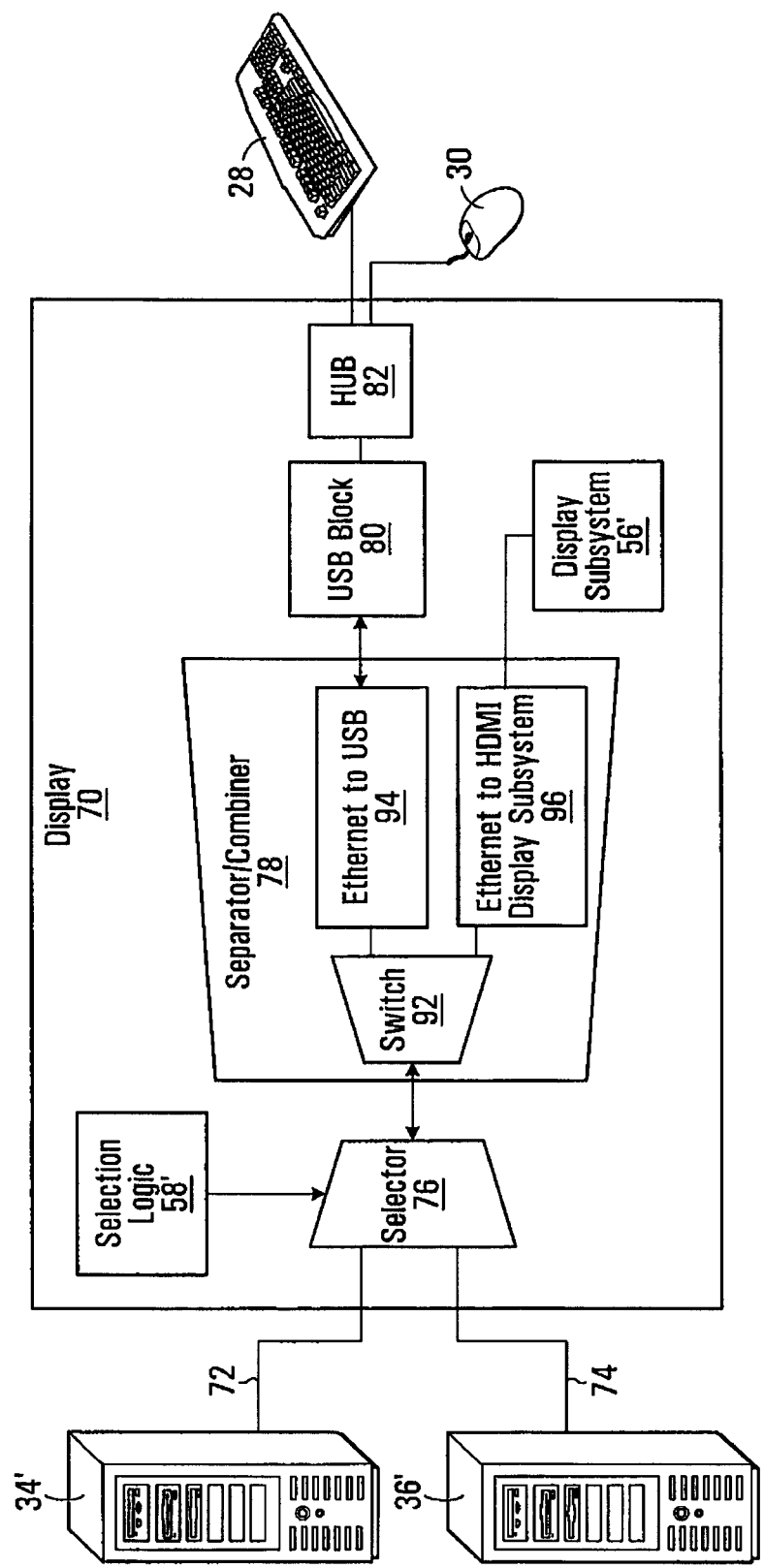
FIG. 6 is a detailed schematic diagram of the exemplary display device of FIG. 5.

FIG. 6 depicts a schematic diagram of one specific embodiment of display 70. As illustrated, display 70 may contain a display subsystem 56', an input selector 76, a separator/combiner 78, a USB interface block 80 and a USB hub 82. Display 70 is interconnected to devices 34', 36' via links 72, 74. Selection logic 58' may be in electrical communication with selector 76.

As may be appreciated, in FIGS. 5-6 separate interconnections for peripheral data are not required between computing devices 34', 36' and display 70. Instead, peripheral data traffic (e.g. USB data) may be transported along with video data over the same physical link (e.g., link 72 for computing device 34' and link 74 for computing device 36') and provided to inputs in display 70.

Links 72, 74 may be compliant to a digital interface that carries a digital video channel and an auxiliary channel which may be used to carry peripheral data along with video data. In one specific embodiment, links 72, 74 may Ethernet links that carry encapsulated DisplayPort standard version 1.2 compliant data, and encapsulated USB data.

Links 72, 74 may provide a uni-directional video channel to provided video data from devices 34' and 36' to display 70, and one or more a bi-directional channels between devices 34' and 36' and hub 82 of display 70.

Each computing device 34', 36' may contain a transmitter circuit for forming and outputting a multiplexed stream of video (e.g., DisplayPort, DVI or HDMI, etc.) and auxiliary data (e.g. peripheral data). The transmitter circuit may accept video as well as peripheral data, and packetize the received data according to a predefined standard (e.g. Ethernet) to provide a corresponding receiver input in display device 70 with a compatible signal and data format. Example DisplayPort and HDMI to Ethernet converters that may act as part of such a transmitter circuit, for example, will be known to those of ordinary skill. As such, the transmitter circuit encapsulates HDMI, DisplayPort or similar video data in Ethernet frames. Transmitter circuit may further accept peripheral data to be multiplexed with the video data and encapsulated in Ethernet frames, carried along with Ethernet frames carrying video. As required, the video data and peripheral data may be further encapsulated in packets to facilitate multiplexing. For example, the video data and peripheral data may be further encapsulated in UDP, TCP/IP or similar packets. As desired video data and peripheral data may be compressed using known compression techniques.

An example transmitter that combines DVI video data, and USB peripheral data over Ethernet, uses the PC-over-IP (PCoIP) protocol developed by Teradici, of Vancouver, Canada.

Data exchange between computing devices 34', 36' and display 70 may be bi-directional.

At display 70, multiplexed video and peripheral data is received over links 72, 74 at a selector 76. Selector 76 selects data from one of links 72, 74 and provides it to Ethernet receiver/separator 78.

Ethernet receiver/separator 78 may demultiplex Ethernet frames carrying video data from those carrying peripheral data at a suitable demultiplexer 92, that may be formed as a packet or Ethernet switch. Video data may further be de-encapsulated into a digital video stream in the format provided by devices 34'/36' (e.g. HDMI, DisplayPort, or the like), by Ethernet to video format converter 94. Ethernet to video format converter 94 may for example be Ethernet to HDMI, or Ethernet to DisplayPort or similar converter. Likewise, peripheral data may be de-encapsulated. To this end, peripheral data may be provided to Ethernet to USB (or similar) converter 96 that provides a USB output stream. Ethernet to USB converter 96 may allow for two-way Ethernet to USB and USB to Ethernet conversion.

De-encapsulated peripheral data, in the form of USB data, may be provided to USB interface block 80 that may provide a virtual USB interface to hub 82 and receive data from receiver/separator 78, and feed data thereto.

Selection logic 58' may be substantially similar to selection logic 58. Selection logic 58' may be used to select a particular input in selector 76.

Selector 76 may be an Ethernet selector that accepts two or more Ethernet terminations and selectively provides data from one of them at its output.

In some embodiments, USB interface block 80 and USB hub 82 may be formed on a single integrated circuit. In others, they may form part of a larger circuit that includes additional blocks depicted in FIG. 6. Many alternatives are possible.

In operation, each computing device 34', 36' may transmit a multiplexed stream of video and peripheral data, to stream inputs in display 70. Selector 76 may selectively couple one of its inputs to its output based on selection signals provided by selection logic 58'. As shown, the output of selector 76 is provided to the input of receiver/separator 78. Receiver/separator 78 may then de-multiplex the received multiplexed stream (and de-encapsulate each stream, as required) to provide peripheral data to interconnected peripheral hub 82, and separately provide video data to display subsystem 56'.

The peripheral data output of receiver/separator 78 may first be fed into USB interface block 80 before it is received by hub 82. For USB compliant peripheral data, USB interface block 80 may extract portions of the received peripheral output of receiver/separator 78 to form USB packets to provide the USB packets using the appropriate USB compliant electrical and/or mechanical interface to an upstream port of hub 82.

Hub 82 in turn provides interconnection to peripherals (e.g. keyboard 28 and mouse 30) attached to display 70.

Conveniently, selector 76 (and thus display 70) may be operated in one of two states. In a first state, selector 76 couples the input interconnecting link 72, to receiver/separator 78 to provide video and peripheral data from computing device 34'. In a second state, selector 76 couples the input interconnecting link 74, to receiver/separator 78 to provide video and peripheral data from computing device 36'. In either of the two states, receiver/separator 78 separates the received data and provides display subsystem 56' with video data, while concurrently providing hub 82 with peripheral data. Likewise, receiver/separator 78 receives data from hub 82 and provides this data to computing device 36'.

Accordingly, in the first state, peripheral data from computing device 34' is provided to peripherals interconnected to display 70 (i.e., keyboard 28 and mouse 30), and video data from computing device 34' is provided to display subsystem 56'. However, in the second state, peripheral data from computing device 36' is provided to peripherals interconnected to display 70, while video data from computing device 36' is concurrently provided to display subsystem 56'. Conveniently, a user of display 70 may successfully interact with just the selected computing device at a time.

In the embodiments of FIGS. 5 and 6, video data and peripheral data are encapsulated over another data connection (e.g. an Ethernet connection). The data connection may be wired (e.g. a 1000 BaseT or similar link), or wireless, using for example WiFi. Other protocols capable of carrying video data and peripheral data may include the Wireless Gigabit, and HDBaseT protocols. However, conceivably, peripheral data could be carried in an auxiliary channel provided over a digital video link. For example, HDMI 1.4 includes an Ethernet channel that could be used to carry peripheral data. As such, the video data could be carried over links 72, 74 without encapsulation. Likewise, native DisplayPort data could be multiplexed with peripheral data that may or may not be encapsulated.

Figure 7:
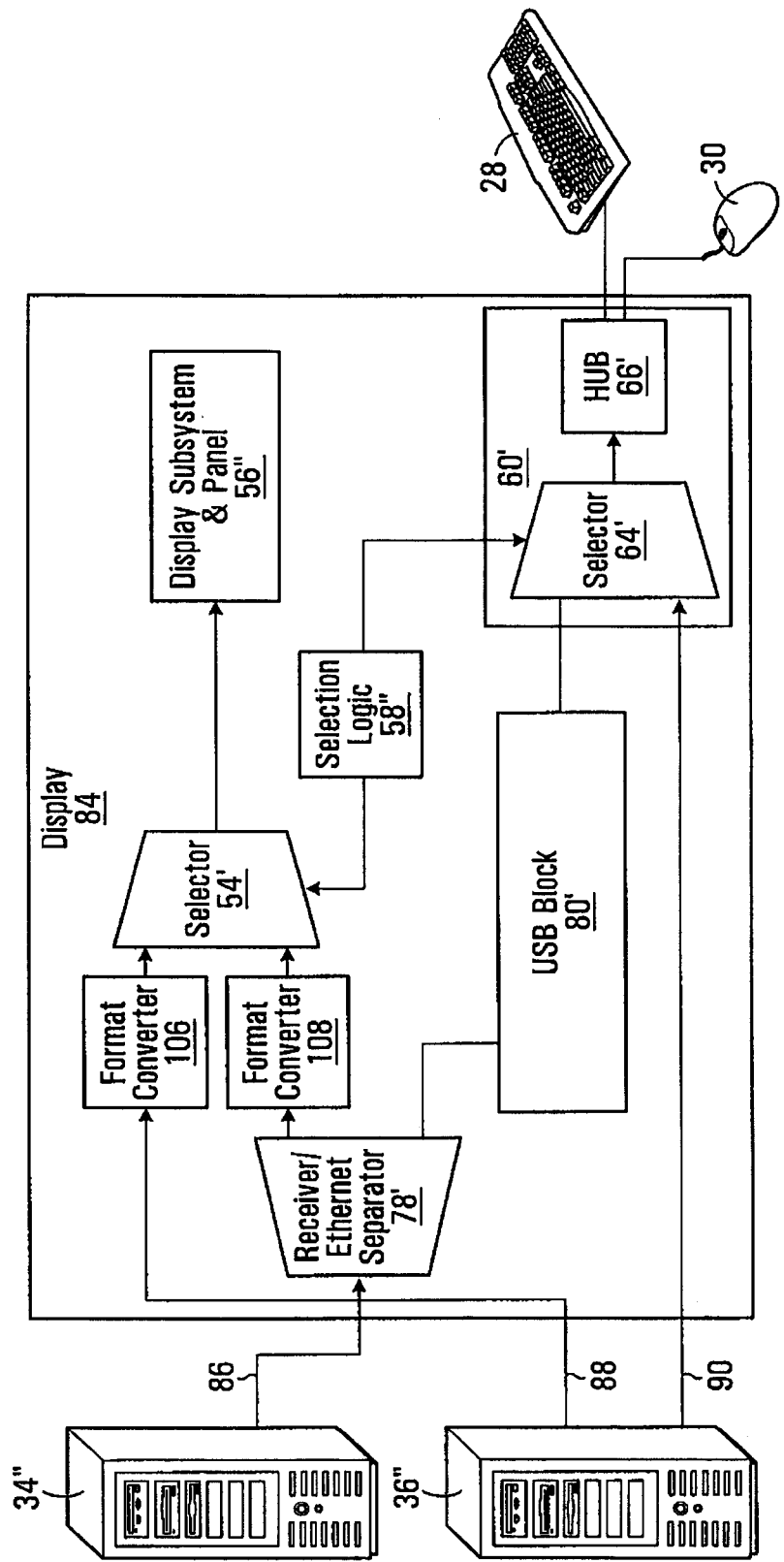
FIG. 7 is a detailed schematic diagram of another exemplary display device interconnected with two computing devices, and also providing interconnection to two peripherals.

FIG. 7 depicts a schematic block diagram of yet another display 84 exemplary of an embodiment of the present invention. Display 84 may include a display subsystem 56" (including a display panel), a receiver/separator 78', a video selector 54', a USB interface block 80', a selection logic 58" and a selection block 60'. Block 60' may include a peripheral selector 64' interconnected to a hub 66'.

Peripheral selector 64' may be substantially similar to selector 64 (FIG. 4) and may be operable to couple one of its two peripheral data inputs as shown and to its peripheral output interconnecting an upstream port of an hub 66'. Hub 66' may also include downstream ports which interconnect to peripherals such as mouse 30 and keyboard 28 as depicted. Selection block 60' may of course further contain various blocks such as phase-locked loop circuits, voltage regulators, passive elements and the like.

Selection logic 58" may be in communication with selector 64' and video selector 54'. Selection logic 58" may be substantially similar to selection logic 58.

Display 84 may include a stream input interconnected to a first computing device 34" by way of a video and peripheral link 86. The stream input may be used to receive a multiplexed stream of video and peripheral data from computing device 34". As depicted in FIG. 7, no dedicated separate peripheral interconnection exists between device 34" and display 84. Peripheral data traffic (e.g., USB data) may be transported over link 86 along with video data. For example, link 86 may be similar to links 72, 74 of FIG. 6, and thus may allow peripheral traffic to be carried over a data link, multiplexed with video data.

Display 84 may also include a video input interconnected to a second computing device 36" by way of video link 88, and a peripheral input interconnected to peripheral link 90 for receiving peripheral data from computing device 36". In one specific embodiment, video link 88 may be a VGA cable, link 90 may be a USB cable and video link 86 may be a DisplayPort compliant link.

USB interface block 80' may be substantially similar to USB interface block 80 and may be formed as a virtualized USB port for interconnection to peripheral selector 64' which may be a USB multiplexer or switch.

In the depicted embodiment, video link 86 interconnects receiver/separator 78' to provide a combined stream of video and peripheral data that may, for example, be carried over Ethernet. Accordingly, receiver/separator 78' may separate video data from the peripheral data traffic, and combine peripheral data from USB interface block 80' with video data and may be substantially the same as receiver/separator 78. Peripheral data output from receiver/separator 78' may be fed into USB interface block 80' which may provide a suitable interface to selector 64'. The video output of receiver/separator 78' may be fed to video selector 54' in its native unencapsulated format (e.g. a native HDMI or DisplayPort video stream).

Optional video format converters 106, 108 may convert the format of video data on links 86, 88 to a common format used by display 84. Conveniently then, video on links 86, 88 may be compliant with different video formats. Alternatively, format converters 106, 108 could be replaced with a suitable format converter downstream of video selector 54'.

Video selector 54' may be substantially similar to video selector 54 in FIG. 4. Accordingly selector 54' may be a 2-to-1 switch formed as an integrated circuit, which selectively couples one of its two inputs to its output. Video selector 54' may also accept both analog (e.g. VGA) and digital video signal inputs to selectively output one of the inputs to display subsystem 56". An integrated circuit such as SAA6713 from NXP Semiconductors (formerly Philips Electronics) may be used to form selector 54'.

USB interface block 80' may provide a physical and electrical interface to one input of selector 64' which as an output that interconnects an upstream port of hub 66'. The other input of selector 64' interconnects link 90, which provides USB data from device 36".

In operation, display 84 may be in one of two states. In the first state, video selector 54' couples video data provided by receiver/separator 78' (i.e., device 34") to display subsystem 56"; and selector 64' concurrently couples the peripheral data from receiver/separator 78' (i.e., device 34") to hub 66'. In the second state however, video selector 54' couples the video input interconnected to device 36" (via link 88) to display subsystem 56", while selector 64' couples the peripheral input interconnecting device 36" (via link 90) to hub 66' to provide a peripheral data from device 36" to attached peripherals.

It may be appreciated that display 84 may be formed from display 44 by adding a stream input (similar to the input interconnecting link 86 in display 84) for receiving a multiplexed stream of video data and peripheral data; and introducing a de-multiplexer (such as receiver/separator 78') coupled to the video selector (i.e., selector 54) and the peripheral selector (i.e., selector 64) in the manner shown in FIG. 7.

In variations of the above embodiments, N:1 selector circuits (e.g., multiplexers with N inputs and one output) may be used instead of the 2:1 selectors discussed in the exemplary embodiments described above. The selector circuits may assume a corresponding number (e.g. N) states.

As may now be appreciated, exemplary embodiments of the present invention allow the same set of peripherals (e.g., one keyboard, one mouse and one display monitor), to interact with a selected one of multiple computers. In addition, cable clutter may be reduced or avoided by use of exemplary embodiments in which peripheral data and video data may be transported over the same physical link.

Many computing environments, such as software development and testing laboratories, clustered computing rooms, computing stations in physically small areas and the like, would benefit from the use of one or more embodiments of the present invention.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A display operable in one of at least a first and second states, said display comprising:
a first multiplexed stream input for receiving a first multiplexed stream of video data to be displayed at said display and peripheral data;
a second multiplexed stream input for receiving a second multiplexed stream of video data to be displayed at said display and peripheral data;
a peripheral output for attaching at least one peripheral;
a multiplexed stream selector in communication with said first and second multiplexed stream inputs, said multiplexed stream selector having a multiplexed stream output to provide a selected one of said first and second multiplexed streams, said multiplexed stream selector coupling: said first multiplexed stream input to said multiplexed stream output in said first state, and said second multiplexed stream input to said multiplexed stream output in said second state;

a peripheral data separator in communication with said multiplexed stream output of said multiplexed stream selector to receive said selected multiplexed stream, said peripheral data separator having an output in communication with said peripheral output to provide peripheral data extracted from an auxiliary channel of said selected multiplexed stream; and a display subsystem in communication with said multiplexed stream output of said multiplexed stream selector to display video data carried in said selected multiplexed stream.

2. The display of claim 1, further comprising a peripheral hub interconnected to said peripheral output.

3. The display of claim 2, further comprising selection logic for placing said display in one of said first and second states.

4. The display of claim 3, wherein said hub comprises a plurality of downstream ports for attaching a plurality of peripherals.

5. The display of claim 4, wherein at least one peripheral is attached to one of said plurality of downstream ports of said hub.

6. The display of claim 4, wherein said hub is a USB hub and said plurality of peripherals comprise USB compliant devices.

7. The display of claim 6, wherein at least one of said first multiplexed stream input and said second multiplexed stream input receives DisplayPort compliant video data.

8. The display of claim 6, wherein at least one of said first multiplexed stream input and said second multiplexed stream input receives HDMI or DVI compliant video data.

9. The display of claim 3, wherein said selection logic is formed as one of: a microcontroller, a switch, a sensor activated circuit, a processor, and voltage detector circuit.

10. The display of claim 9, wherein said selection logic places said display in said first state, in response to detecting a signal at said first multiplexed stream input.

11. The display of claim 9, wherein said selection logic places said display in said second state, in response to detecting a signal at said second multiplexed stream input.

12. The display of claim 1, wherein at least one of said first multiplexed stream and said second multiplexed stream is carried on a single physical link.

13. The display of claim 12, wherein at least one of said first multiplexed stream and said second multiplexed stream is an Ethernet stream and said peripheral data separator comprises an Ethernet interface, for receiving at least one of said first multiplexed stream and said second multiplexed stream over an Ethernet link.

14. The display of claim 1 wherein at least one of said first multiplexed stream input and said second multiplexed stream input is part of a wireless interface to receive video or peripheral data wirelessly.

15. A display operable in one of a first and second states comprising:

first and second combined stream inputs for receiving combined streams of video data to be displayed at said display and auxiliary data, carried on the same physical link;

an auxiliary data separator comprising: an input for receiving a selected one of said combined streams, and an output to provide auxiliary data extracted from an auxiliary channel of said selected combined stream;

a combined stream selector in communication with said first and second combined stream inputs having an output coupled to said input of said auxiliary data separator; said selector coupling: said first combined stream input to said auxiliary data separator in said first state, and said second combined stream input to said auxiliary data separator in said second state, and a display subsystem in communication with said output of said combined stream selector to display video data carried in said selected combined stream.

16. The display of claim 15, further comprising a hub interconnected to said output of said auxiliary data separator.

17. The display of claim 16, further comprising a USB interface in communication with said hub and said auxiliary data separator to provide an electrical interface between said auxiliary data separator and said hub.

18. The display of claim 16, wherein said hub is a USB hub.

19. The display of claim 15, further comprising selection logic for placing said display in one of said first and second states.

20. The display of claim 19, wherein said selection logic places said display in said first state, in response to detecting a signal at said first combined stream input.

21. The display of claim 19, wherein said selector logic places said display in said second state, in response to detecting a signal at said second combined stream input.

22. The display of claim 15, wherein said auxiliary data separator comprises an Ethernet interface, for receiving said selected combined stream over an Ethernet link.

23. The display of claim 15, wherein said video data comprises DisplayPort compliant video data and said auxiliary data comprises USB compliant data.

24. The display of claim 15, wherein said video data comprises one of DVI or HDMI compliant video data and said auxiliary data comprises USB compliant data.

25. The display of claim 15, wherein said same physical link comprises a wireless link.

26. A method of sharing a display and at least one peripheral among at least a first and second computing devices, said display comprising: first and second multiplexed stream inputs for respectively receiving first and second multiplexed streams of video data to be displayed at said display and peripheral data, a hub, a display subsystem, a multiplexed stream selector interconnecting said first and second multiplexed stream inputs with said display subsystem and a peripheral data separator, said method comprising:

attaching said at least one peripheral to said hub in said display;

attaching first and second multiplexed stream outputs from said first and second computing devices to said first and second multiplexed stream inputs of said display, respectively;

selectively providing peripheral data extracted by said peripheral data separator from an auxiliary channel of one of said first and second multiplexed streams to said at least one peripheral through said hub, as said display subsystem is provided with a video signal from said first and second computing devices, respectively, by way of said first and second multiplexed stream inputs.

* * * * *